United States Patent [19]

Knight

[11] Patent Number: 5,503,113
[45] Date of Patent: Apr. 2, 1996

[54] PET HARNESS WITH CINCH BAND

[76] Inventor: Linda D. Knight, 5648 Foothill Blvd. Space 7, Grants Pass, Oreg. 97526

[21] Appl. No.: 287,408

[22] Filed: Aug. 8, 1994

[51] Int. Cl.⁶ ..................................................... A01K 27/00
[52] U.S. Cl. .............................. 119/856; 119/792; 119/907
[58] Field of Search ..................... 119/771, 792, 119/856, 907

[56] References Cited

U.S. PATENT DOCUMENTS

| | | | |
|---|---|---|---|
| 2,605,744 | 8/1952 | Urbanski | 119/856 X |
| 2,826,172 | 3/1958 | Buckle | 119/792 |
| 3,310,034 | 3/1967 | Dishart | 119/771 |
| 3,311,088 | 3/1967 | Peterlin | 119/793 |
| 4,060,056 | 11/1977 | Maietta | 119/793 |
| 4,483,275 | 11/1984 | DeGroot | 119/793 |
| 4,964,369 | 10/1990 | Spors | 119/864 |
| 5,305,710 | 4/1994 | Ward, Jr. | 119/792 X |
| 5,359,964 | 11/1994 | Sporn | 119/792 X |

FOREIGN PATENT DOCUMENTS

| | | | |
|---|---|---|---|
| 2301273 | 9/1976 | France | 119/907 |
| 4235782 | 5/1993 | Germany | 119/907 |

Primary Examiner—Robert P. Swiatek
Attorney, Agent, or Firm—James D. Givnan, Jr.

[57] ABSTRACT

A pet harness having a cinch band extending about the forward portion of the animal's torso and which includes an upwardly projecting portion with a ring to receive a leash. Shoulder strap includes a ring member through which the upwardly projecting portion of the cinch band extends. The shoulder straps terminate forwardly at a connector which also receives a retention strap which joins the forward ends of the shoulder straps to the cinch band. The animal is restrained by closure of the cinch strap about the torso and tensioning of the shoulder straps which occur simulataneously from leash or other restraint imparted forces.

3 Claims, 1 Drawing Sheet

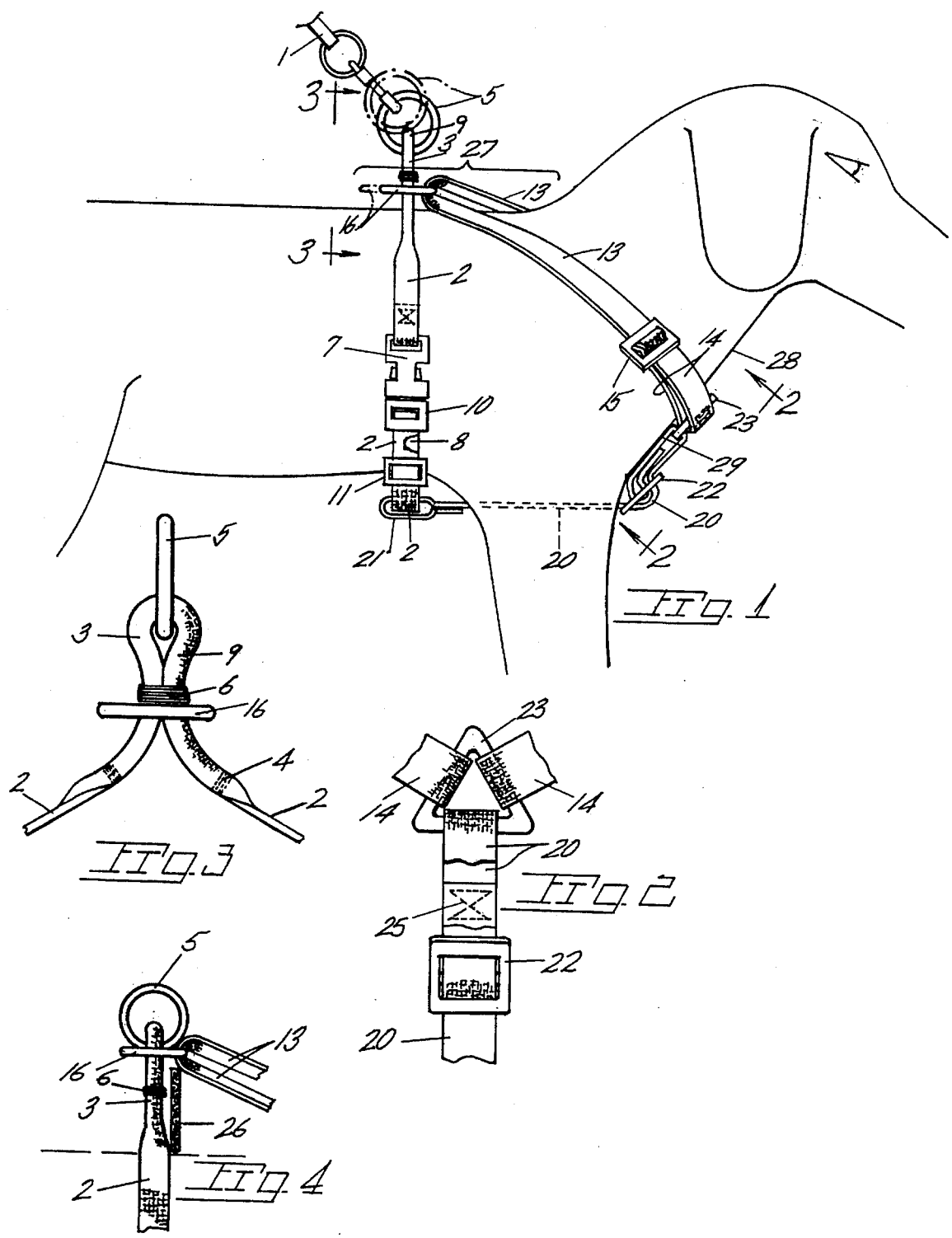

PET HARNESS WITH CINCH BAND

BACKGROUND OF THE INVENTION

The present invention pertains generally to harnesses for pets including dogs and other four legged animals.

In the restraining of pets by conventional harnesses or collars the possibility exists that injury to the soft tissue of the animal's neck as well as physical damage to the pet's cervical skeletal system during restraint. For example, choke chains and collars, if pulled in a sudden and forceful manner, may impart such injuries.

Further, attempts by pet owners to utilize existing harnesses and collars in combination with automobile restrain systems can result in injury to and choking of the animal. An automotive seat belt inserted through a collar or harness, not intended for such use, may result in injurious forces being applied to the animal's neck or skeletal system.

U.S. Pat. No. 2,826,172 shows a harness with loops about the torso and chest of an animal with one of the loops being closable about the torso. U.S. Pat. No. 3,311,088 shows a leash with a ring to permit passage of the leash about a dog's torso. U.S. Pat. No. 4,483,275 shows a head attached halter for training dogs. U.S. Pat. No. 4,060,056 discloses a harness whereby a frontal portion passes across the animal's chest. U.S. Pat. No. 3,310,034 shows a seat belt attached harness having a body strap, a collar attached to said strap with rings attached to both to route an auto seat belt about the chest of a pet.

SUMMARY OF THE PRESENT INVENTION

The present harness is directed toward providing effective restraining forces by a band about the torso of the animal and the tightening of shoulder strap means against the animal's shoulders.

In the present harness, a cinch band extends about the forward torso with a portion of the band projecting upwardly through a ring for reception of a leash. Leash imparted forces act to close the cinch band about the animal's chest which effectively discourages further effort of the animal against leash restraint. In conjunction with the action of the cinch band, a pair of shoulder straps are drawn rearwardly against the animal's shoulders which are suitable for the application of such loads. For use in an automobile for pet restraint, the present harness cinch band and shoulder straps distrubute forces from a seat belt passing between the cinch band and the juncture of the rearward ends of the shoulder straps with the cinch band. For confining a pet at a fixed point in a vehicle, a vehicle carried latch may be inserted through ring components of the cinch band and of the shoulder straps.

Important objectives of the present invention include the provision of a pet harness with shoulder straps which are indirectly tightened against the pet's shoulders upon leash or other imparted forces being applied to a cinch band of the harness, all contributing to pet restraint and the effective discouragement of the pet's actions; the provision of a harness which provides a hand hold for manually gripping the harness to support a portion of the animal's weight or to provide tighter physical control of the animal by the pet owner; the provision of a pet harness suitable for use in conjunction with automotive restraint systems.

BRIEF DESCRIPTION OF THE DRAWINGS

In the drawings:

FIG. 1 is a side elevational view of the present harness in place on a pet;

FIG. 2 is an elevational view taken along line 2—2 of FIG. 1;

FIG. 3 is an elevational view taken along line 3—3 of FIG. 1; and

FIG. 4 is a fragmentary elevational view of parts of the harness shown in FIG. 1 relocated to permit insertion of an automotive seat belt.

DETAILED DESCRIPTION OF THE PREFERRED EMBODIMENTS

With continuing attention to the drawings wherein reference numerals indicate parts similarly hereinafter identified, the reference numeral i indicates a segment of a leash for attachment to the present harness.

The present harness includes a cinch band 2 shown on a pet and somewhat rearwardly spaced, an inch or so, from the animal's front legs. The band preferably includes a lengthwise folded segment 3 stitched at 4 to facilitate passage through a later described ring component of shoulder strap means. A circular fitting at 5 on the cinch band is held in place on the band by stitching 6 and serves to receive leash 1 (FIG. 1) or other restraint. A buckle 7 facilitates installation and removal of the harness while a doubled back band segment 8 is threaded through a buckle component 10 and then reversed for looped engagement with a plate 11 and then stitched to itself to provide a sizing feature of the cinch band. A band looped segment is at 9.

Shoulder strap means includes a strap at 13 having end segments as at 14 which pass through and are reversed about a later described connector and then each secured to an adjustment plate as at 15 as by looped passage therethrough and subsequent stitching to the reversed portion. Accordingly the overall length of the strap means 13 may be altered to enable harness use with a range of pet sizes. A ring at 16 on the shoulder strap receives the earlier described portion 3 of the cinch band and, upward rearward displacement of band portion 3 by leash or other restraint applied forces, the ring 16 is displaced rearwardly to pull the shoulder strap means into forceful engagement with the animal's shoulders. The ring 16 is of lesser size than circular fitting 5 to ensure assembly of the cinch band and shoulder strap means.

To retain the harness in place on the pet, a retention strap 20 includes an eye 21 through which cinch band 2 passes with the strap extending forwardly between the front legs of the animal. The strap passes through an adjustment plate 22 and thence upwardly through a triangularly shaped connector 23 about which the strap is reversed and then looped about plate 22 and stitched to itself at 25 for strap adjustment purposes. Connector 23 additionally serves, as above noted, to receive the looped end segments 14 of shoulder strap means 13 and from which connector the strap means diverges to avoid contact with the pet's neck.

In FIG. 4 harness components are slightly relocated to admit passage of an automotive seat belt 26 below the juncture of the cinch band 2 and shoulder strap means 13 with seat belt 26 being confined by the abutment of ring 16 upwardly against circular fitting 5. Forward displacement of the pet in a braking automobile is prevented by shoulder strap means 13 with the upper portion of cinch band 2 being retained by the seat belt resulting in closing action of the band about the animal's torso.

The shoulder strap means 13 provides a handgrip at 27 where the strap means diverges after being reversed through ring 16. Grasping of the diverging segments and imparting an upward force on same will result in tight restraint and control of the pet as both the cinch band 2 and the shoulder strap means 14 will be tensioned without harm to the animal. Handgrip 27 includes both circular fitting 5 and ring 16 when it is desired to provide at least partial upper body support to the animal such as when the animal is lame or recovering from an injury or ailment.

During restraint of the animal, it will be noted that the application of pressure to the animal's frontal neck area 28 is avoided as forces are imparted to the chest area at 29 instead. During such restraint, looped segment 9 moves upwardly and rearwardly with fitting 5 per FIG. 1 relative the animal's torso to tighten cinch band 2 about the animal's torso and displace ring 16 rearwardly urging shoulder straps 13 against the shoulders and chest of the animal.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. A harness for a pet including a cinch band for upright placement about the pet's torso with stitching forming a looped segment and a fitting on said segment to receive a leash, shoulder strap means including a ring through which said looped segment of said band projects, retention means interconnecting said cinch band and said shoulder strap means and including an eye through which the cinch band passes and a triangularly shaped connector receiving said shoulder strap means, said shoulder strap means diverging upwardly from said connector and away from a pet's neck, and forces imparted to said cinch band by a leash causing upward displacement of said looped segment of the band and contraction of the band about the pet's torso to restrain the pet without risk of injury to the pet's neck.

2. The harness claimed in claim 1 wherein said ring is displaceable rearwardly relative the pet by leash imparted forces to tension said shoulder strap means against the pet's shoulders.

3. A harness for a pet and including, a cinch band for placement about the pet's torso with stitching to form a looped segment, a fitting in place on the looped segment to receive a restraint, shoulder strap means including a ring through which the looped segment of said cinch band passes in a slidable manner, retention means coupling said cinch band to said shoulder strap means and including a triangularly shaped connector receiving said shoulder strap means and from which said shoulder strap means diverges, and forces applied to said fitting in a rearwardly and upwardly direction relative to the pet's torso by the restraint serving to tighten the cinch belt about the torso of the animal and to urge the shoulder strap means against the shoulders and chest of the pet.

\* \* \* \* \*